US011130578B1

(12) United States Patent
Dowty et al.

(10) Patent No.: US 11,130,578 B1
(45) Date of Patent: Sep. 28, 2021

(54) ADJUSTABLE OTTOMAN

(71) Applicant: B/E Aerospace, Inc., Winston-Salem, NC (US)

(72) Inventors: Mark B. Dowty, Rural Hall, NC (US); Bobby Lawson, Walnut Cove, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/663,076

(22) Filed: Oct. 24, 2019

(51) Int. Cl.
*B64D 11/06* (2006.01)
*B60N 3/06* (2006.01)

(52) U.S. Cl.
CPC ...... *B64D 11/0643* (2014.12); *B64D 11/0696* (2013.01)

(58) Field of Classification Search
CPC ........ A47C 16/025; B60N 2/995; B60N 2/34; B60N 2/01; B60N 2/06; B64D 11/06; B64D 11/0604; B64D 11/0641; B64D 11/0601; B64D 11/064; B64D 11/0643; B64D 11/0606; B64D 11/0638; B60R 2021/0053; B60R 2021/0093
USPC ...................... 297/68, 69, 70, 73, 76, 423.36
See application file for complete search history.

(56) References Cited

U.S. PATENT DOCUMENTS

| 1,918,261 A | * | 7/1933 | Ludwig | ................ | A47C 17/207 297/108 |
| 1,934,281 A | * | 11/1933 | Stay | ........................ | A47J 36/02 420/548 |
| 1,984,281 A | * | 12/1934 | Poggendorf | ........... | A47C 1/035 297/317 |
| 2,869,620 A | | 1/1959 | Gleitsman | | |
| 2,912,046 A | | 11/1959 | Fuerst | | |
| 5,333,818 A | * | 8/1994 | Brandt | ................... | B64D 11/06 244/118.6 |
| 5,628,547 A | * | 5/1997 | Matsumiya | ........... | B60N 2/242 297/354.11 |
| 5,954,401 A | | 9/1999 | Koch et al. | | |
| 6,305,644 B1 | * | 10/2001 | Beroth | ................... | B64D 11/00 244/118.5 |
| 6,352,309 B1 | | 3/2002 | Beroth | | |
| 6,588,837 B1 | * | 7/2003 | Schultz | ................ | A47C 17/165 297/111 |
| 6,773,074 B2 | * | 8/2004 | Flory | ..................... | B60N 2/995 297/423.34 |

(Continued)

FOREIGN PATENT DOCUMENTS

| DE | 102006053031 A1 | 6/2008 |
| EP | 1116654 A2 | 7/2001 |

(Continued)

OTHER PUBLICATIONS

Search Report for European Application No. 20203935.0 dated Mar. 9, 2021, 7 pages.

*Primary Examiner* — Shin H Kim
(74) *Attorney, Agent, or Firm* — Suiter Swantz pc llo

(57) ABSTRACT

An ottoman for an aircraft passenger seat is disclosed. In one or more embodiments, the ottoman may include a base. The ottoman may include a frame. The ottoman may include a shell. The ottoman may include a resting surface. The ottoman may include an actuation assembly. The actuation assembly is configured to actuating the resting surface from a first actuation position relative to the base. The ottoman may include an attachment surface. The attachment surface provides and anchor point for the actuation assembly.

15 Claims, 8 Drawing Sheets

(56) References Cited

U.S. PATENT DOCUMENTS

| | | | |
|---|---|---|---|
| 7,455,342 B2 | 11/2008 | Lechkun et al. | |
| 7,621,599 B2 * | 11/2009 | Whalen | A47C 7/50 |
| | | | 297/423.21 |
| 8,616,643 B2 * | 12/2013 | Darbyshire | B64D 11/0604 |
| | | | 297/342 |
| 9,155,394 B1 * | 10/2015 | Cohen | A47C 7/506 |
| 9,227,729 B2 * | 1/2016 | Udriste | B64D 11/064 |
| 10,661,693 B2 * | 5/2020 | Newell | B60N 3/06 |
| 10,829,222 B2 * | 11/2020 | De La Garza | B64D 11/06395 |
| 2007/0102985 A1 * | 5/2007 | Taniguchi | B60N 2/995 |
| | | | 297/423.36 |
| 2008/0143137 A1 * | 6/2008 | Bowen | B60N 3/063 |
| | | | 296/75 |
| 2009/0058150 A1 * | 3/2009 | Whalen | B60N 2/90 |
| | | | 297/69 |
| 2009/0108648 A1 * | 4/2009 | Biggs | A63B 23/03575 |
| | | | 297/217.1 |
| 2009/0146005 A1 * | 6/2009 | Bettell | B64D 11/064 |
| | | | 244/118.6 |
| 2009/0302158 A1 * | 12/2009 | Darbyshire | B64D 11/06 |
| | | | 244/118.6 |
| 2010/0132118 A1 * | 6/2010 | Robertson | A47C 1/0242 |
| | | | 5/617 |
| 2012/0139322 A1 * | 6/2012 | Wesselink | B64D 11/0649 |
| | | | 297/423.1 |
| 2014/0354020 A1 * | 12/2014 | Meister | B64D 25/04 |
| | | | 297/216.1 |
| 2015/0136904 A1 | 5/2015 | Savard et al. | |
| 2017/0259921 A1 * | 9/2017 | Valdes De La Garza | B64D 11/0641 |
| 2018/0029716 A1 | 2/2018 | Sieben | |
| 2020/0238880 A1 * | 7/2020 | Valdes De La Garza | B64D 11/0604 |

FOREIGN PATENT DOCUMENTS

| | | |
|---|---|---|
| EP | 2234884 A2 | 10/2010 |
| GB | 2559990 A | 8/2018 |
| JP | H03173813 A | 7/1991 |
| JP | H11137368 A | 5/1999 |
| JP | 2001157618 A | 6/2001 |
| JP | 2019018622 A | 2/2019 |
| SG | 143774 A | 12/2006 |
| WO | 2006083158 A1 | 8/2006 |

* cited by examiner

ADJUSTABLE OTTOMAN

BACKGROUND

Select passenger aircraft include main cabin premium areas (e.g., business-class areas and/or first-class areas), where the main cabin premium areas include partitioned areas and/or premium enclosed compartments. The premium areas may include amenities such as, but not limited to, convertible aircraft seats (e.g., reclining seats, lay-flat seats including a bed mode, or the like). Airlines may wish to provide passengers occupying the main cabin premium areas with an ottoman proximate to the convertible aircraft seats. The ottoman may be a stand-alone monument independent of the passenger seat, or may have the capability to engage with the passenger seat (e.g., as in bed mode).

Often, the passenger seat and accompanying ottoman in main cabin premium areas have a limited range of movement relative to each other. That is, the distance from the passenger seat and the ottoman is fixed or limited in range, a design that is helpful when the passenger seat is configured to bed mode. The distance between the passenger seat and the ottoman allows a substantial proportion of the adult population to enjoy the use of the ottoman. However, people who are relatively short in stature may not be able to reach the ottoman with their feet, reducing their enjoyment of their flight, Therefore, it would be advantageous to provide a solution that cures the shortcomings described above.

SUMMARY

An ottoman for an aircraft passenger seat is disclosed. In one or more embodiments, the ottoman may include a base. The ottoman may include a frame. The ottoman may include a shell. The ottoman may include a resting surface. The ottoman may include an actuation assembly. The actuation assembly is configured to actuate the resting surface from a first actuation position to a second actuation position relative to the base. The ottoman may include an attachment surface. The attachment surface provides and anchor point for the actuation assembly.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
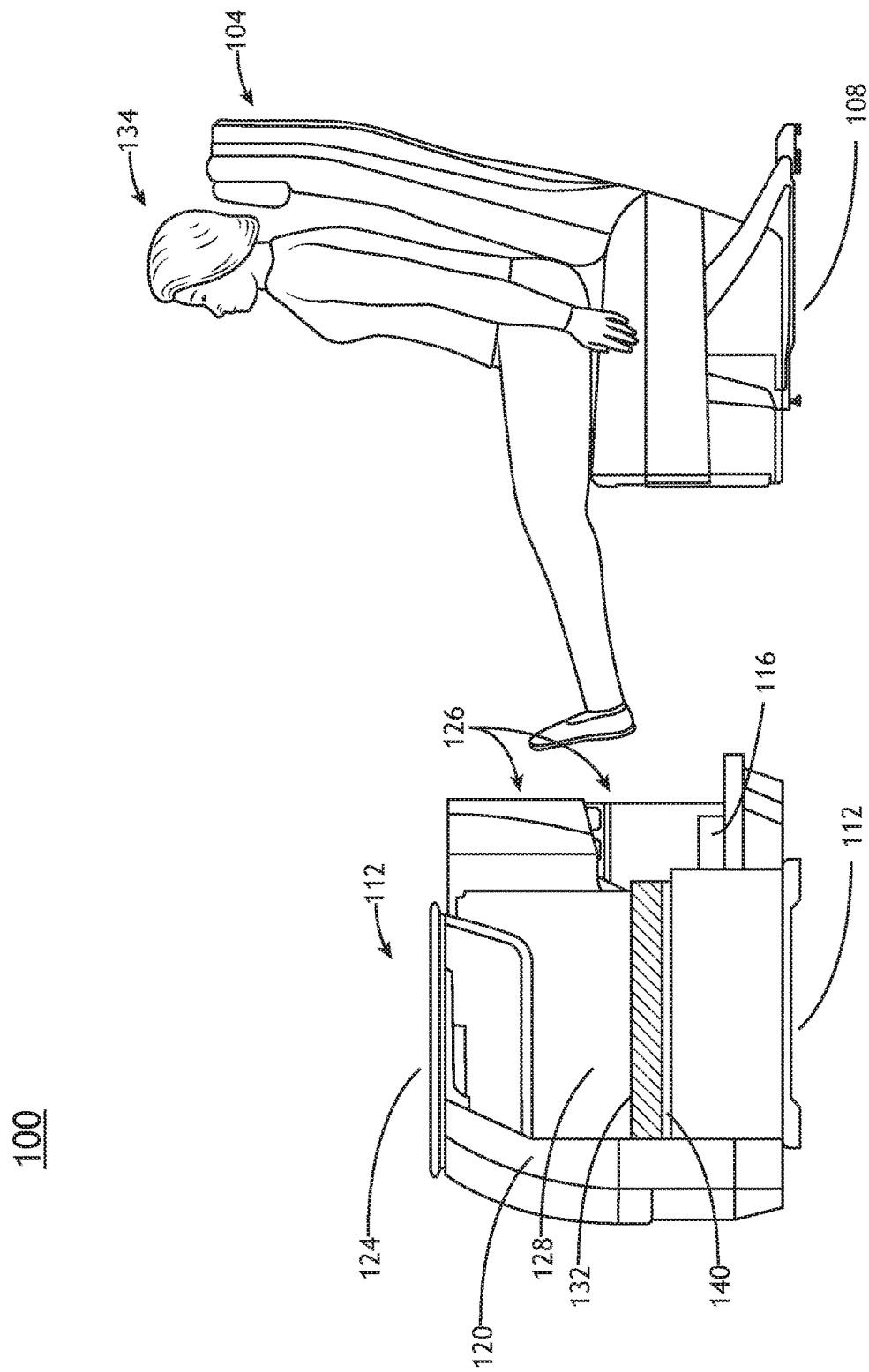
FIG. 1 is a side view of an exemplary embodiment of an ottoman with a resting surface and a passenger seat for an aircraft cabin, in accordance with the inventive concepts disclosed herein.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1-7 generally illustrate exemplary embodiments of an ottoman for an aircraft seat in accordance with the inventive concepts disclosed herein.

Broadly, embodiments of the inventive concepts disclosed herein are directed to an ottoman. More particularly, embodiments of the inventive concepts disclosed herein are directed to an ottoman configured to extend a resting surface towards a passenger seat.

It is noted herein that the ottoman may be implemented in any environment of a number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

Where the environment is an aviation environment, the ottoman may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

FIG. 1 illustrates exemplary embodiments of an aviation environment in accordance with the inventive concepts disclosed herein. For example, the aviation environment may include, but is not limited to, an aircraft cabin 100. The aircraft cabin 100 may include one or more passenger seats 104. For example, the passenger seat 104 may include a seat back, a seat, and/or one or more arms. The passenger seat 104 may include a seat base 108. For example, the seat base 108 may be coupled to one or more floor fittings within the floor of the aircraft cabin 100. In some embodiments, the passenger seat 104 includes an extendable leg rest. The extendable leg rest is coupled to the passenger seat (e.g., the extendable leg rest is not a stand-alone element). The extendable leg rest is actuatable from a folded position to an extended position for use.

The passenger seat 104 may be actuatable (e.g., trackable or slidable) along an axis length-wise relative to the aircraft cabin 100 into a position including, but not limited to, a fore position and/or an aft position. The passenger seat 104 may be rotatable about an axis cross-wise through the passenger seat 104 into a position including, but not limited to, an upright or raised position, a reclined position, and/or a lay-flat or bed position (e.g., one or more bed modes). The passenger seat 104 may be rotatable about an axis (e.g., swivelable) through the passenger seat 104 and the seat base 108 into a position including, but not limited to, an inboard position, a forward-facing position (or rear-facing position, depending on seat placement within the aircraft cabin), and/or an outboard position. The passenger seat 104 may be fully positionable between the outer limits of motion as defined by the moveable components of the passenger seat 104, the seat base 108, and/or other fixed components of the aircraft cabin 100.

It is noted herein a combination of a fully upright position, a fully aft (or fully fore position, depending on seat placement within the aircraft cabin 100) position, and a fully forward-facing position (or fully rear-facing position, depending on seat placement within the aircraft cabin 100) may be considered a taxi, takeoff, or landing (TTOL) position during select stages of flight, for purposes of the present disclosure. In addition, it is noted herein that any position that does not meet the above-defined requirements of the TTOL position may be considered a non-TTOL position, for purposes of the present disclosure. Further, it is noted herein the passenger seat 104 may be actuatable and/or rotatable from the TTOL position to a non-TTOL position, and/or vice versa.

In this disclosure, the aircraft cabin 100 includes an ottoman 112. The ottoman 112 may include a base 114 For example, the base 114 may be coupled to one or more floor fittings within the floor of the aircraft cabin 100. The base 114 may be immobile, restricting the ottoman along the floor of the aircraft cabin 100. In another instance, the base may be mobile, allowing movement of the ottoman in one or more directions.

The ottoman 112 may include a frame 116 (e.g., as indicated by an internal structural element). The frame 116 provides structural integrity to the ottoman 112 as well as providing an anchor or attachment point for ottoman 112 components. The frame 116 may be constructed of any material known in art for the construction of aircraft cabin components, including but not limited to plastic, metal, word, or composite material.

The ottoman 112 may include a shell 120. The shell 120 provides structural integrity, protection and visual aesthetics for the ottoman 112. The shell 120 may extend from the base 114, or from near the base 114 of the ottoman 112 and extend upwards on one or more vertical sides of the ottoman 112. The shell 120 may wrap around portions of the frame 116 and/or extend from the frame 116. The shell 120 and frame 116 may be formed from the same structural element. In some embodiments, the shell 120 may also enclose a top 124 of the ottoman (e.g., the shell 120 extending from the sides of the ottoman 112 and wrapping over the top 124 of the ottoman 112.) By enclosing the ottoman 112, the shell 120 creates a cavity 128 within the ottoman 112, allowing the passenger to place their feet through an entrance 126 (e.g., an opening) into the cavity 128 of the ottoman 112, or to store items within the cavity 128 of the ottoman 112. The shell may 120 be constructed by any material known in the art for manufacturing furnishings and/or components for aircraft cabins 100 (e.g., plastic, plastic or wood). For instance, the shell 120 may be constructed of a composite material.

In some instances, the shell 120 of the ottoman 112, and/or the ottoman 112 itself, may be built into another component within the aircraft cabin (e.g., bulkheads, cabin dividers, or monuments). For instance, the shell 120 and/or ottoman 112 may be built into the bulkhead of an aircraft cabin 100, allowing for efficient use of space. In another instance, the shell 120 and/or ottoman 112 may be built into the passenger seat and/or seating compartment of another passenger. Therefore, the above description should not be interpreted as a limitation of the present disclosure, but merely as an illustration.

The ottoman 112 may include a resting surface 132. The resting surface 132 provides support for a passenger 134 (e.g., legs or feet of the passenger 134). The resting surface 132 is composed of a rigid or semi-rigid structural material (e.g., wood, plastic, metal or composite material) that resists bending upon the weight of a passenger's legs and/or feet. The resting surface 132 may also be covered (e.g., with a cushion or soft material), that increases the comfort of the passenger 134.

In some embodiments, the ottoman 112 includes an actuation assembly 136. The actuation assembly 136 is mechanically linked to the resting surface 132 and actuates the movement of the resting surface 132 from a first actuation position to a second actuation position. The displacement of the resting surface 132 from a first actuation position to a second actuation position may occur without any actuation of the base 114 of the ottoman 112 relative to the cabin floor. For instance, the actuation assembly 136 may actuate the displacement of the resting surface 132 towards the passenger seat 104 while the other components of the ottoman 112 (e.g., the base 114 and/or frame 116) are not displaced. In some embodiments, the actuation assembly 136 requires manual exertion to actuate the resting surface 132 (e.g., pulling and/or lifting of the resting surface 132 from the first actuation position to the second actuation position). In some embodiments, the actuation assembly 136 is actuated by one or more actuation devices (e.g., servo motors, solenoids, or the like).

In some embodiments, the ottoman 112 includes an attachment surface 140 (e.g., the thin surface below the resting surface in FIG. 1). The attachment surface 140 provides an anchor point for the actuation assembly 136. The attachment surface 140 may be any surface within the ottoman 112 that may be used as an anchor point for the actuation assembly. For instance, the attachment surface 140 may be a surface immediately adjacent to the lateral surface of the resting surface 132. In another instance, the attachment surface 140 may be a side wall of the ottoman 112 (e.g., forming part of the shell 120 or frame 116 of the ottoman 112).

Figure 2:
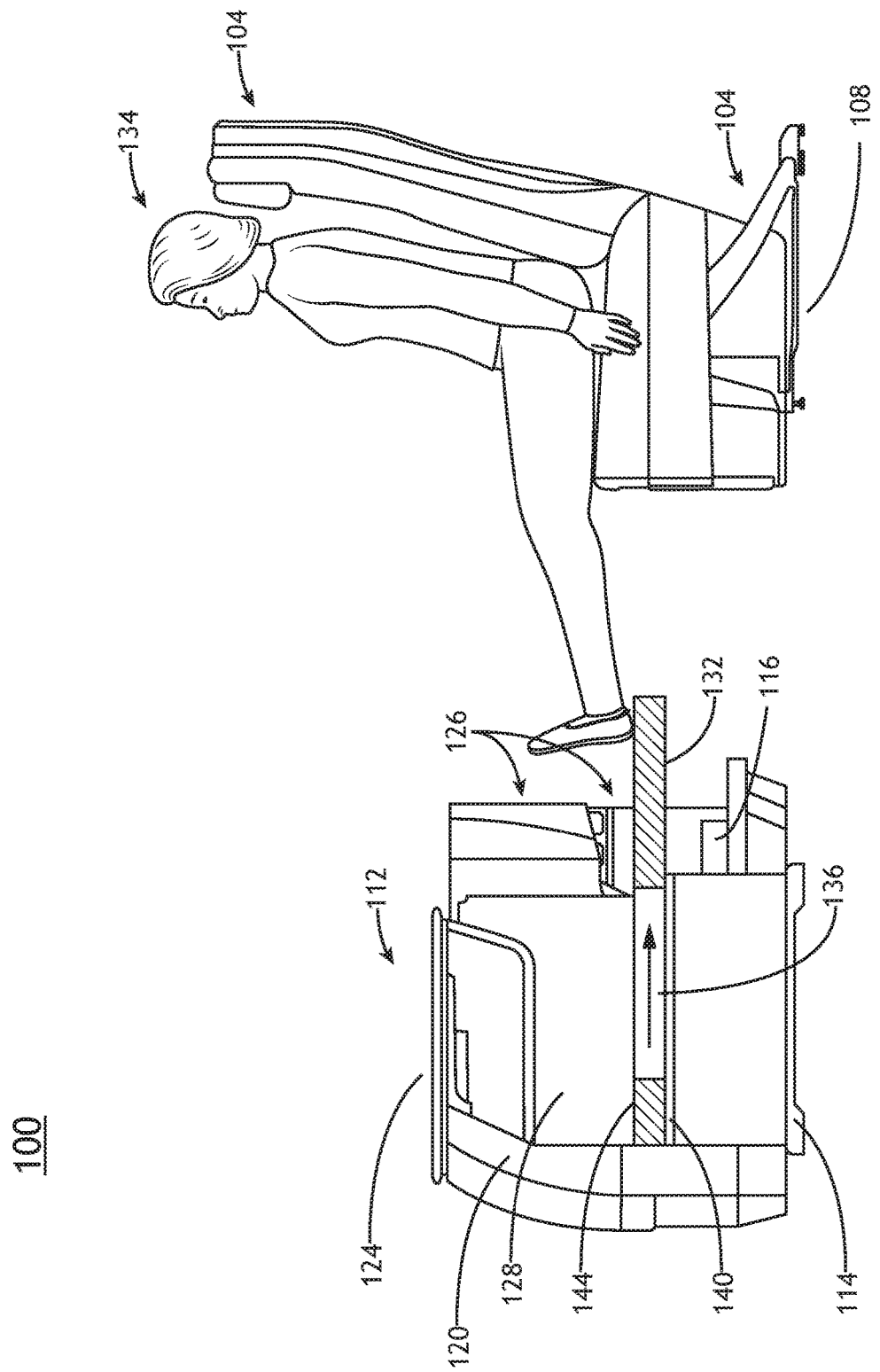
FIG. 2 is a side view of an exemplary embodiment of an ottoman with a resting surface and a passenger seat for an aircraft cabin, where the resting surface extends towards the passenger seat in a sliding motion.

In some embodiments, the resting surface 132 is configured to extend outward from the ottoman 112 from a first actuation position to a second actuation position 104 in a sliding motion. FIG. 2 is a side view of an exemplary embodiment of an ottoman 112 with a resting surface 132 and a passenger seat 104 for an aircraft cabin 100, where the resting surface 132 is configured via the actuation assembly 136 to extend towards the passenger seat 104 in a sliding motion. The extension of the resting surface 132 towards the passenger seat 104 allows a passenger 134 of short height to place their feet on the resting surface 132. The resting surface 132 may be manually actuated from a first actuation position to a second actuation position (e.g., from pulling on the exposed end of the resting surface 132 towards the passenger seat). In some embodiments, the actuation assembly 136 is actuated by one or more actuation devices (e.g., servo motors, solenoids, or the like). In some embodiments, the resting surface 132 may be actuated by either manual exertion or actuation devices.

In some embodiments, the entirety of the resting surface 132 is actuated. In some embodiments, a portion of the resting surface is actuated (e.g., leaving an unactuated portion 144 of the resting surface 132).

The actuation assembly 136 may include any components known in the art to be used to slide an element (e.g., the resting surface 132) relative to an attachment surface 140. For instance, the actuation assembly 136 may include a track and groove (e.g., a slide rail and slide element) mechanism. In another instance, the actuation assembly may include a bearing slide mechanism, including but not limited to, a ball bearing slide, a roller slide, a dovetail slide, a compound slide, or a rack slide. The actuation assembly 136 may include a lock (e.g., mech lock or mechanical lock) configured to lock the position of the resting surface 132 relative to the ottoman 112. The lock may be configured lock the position of the resting surface 132 into a single locked position. The lock may also be configured to lock the position of the resting surface 132 into more than one position. The lock may also be configured to lock the position of the resting surface 132 into an infinite number of positions.

The actuation assembly 136 may be configured to extend the resting surface 132 substantially horizontal from the ottoman 112 (e.g., parallel to the cabin floor). However, the actuation assembly may be configured to extend the resting surface 132 at different angles relative to the cabin floor. For instance, the actuation assembly 136 may be configured to extend the resting surface 132 at an ascending angle (e.g., with the resting surface 132 pointing upward, allowing the resting surface 132 to be used to rest the passenger's legs). In another instance, the actuation assembly 136 may be configured to extend the resting surface 132 at a descending angle (e.g., with the resting surface 132 pointing downward, providing a surface for the passenger to position their feet).

Figure 3:
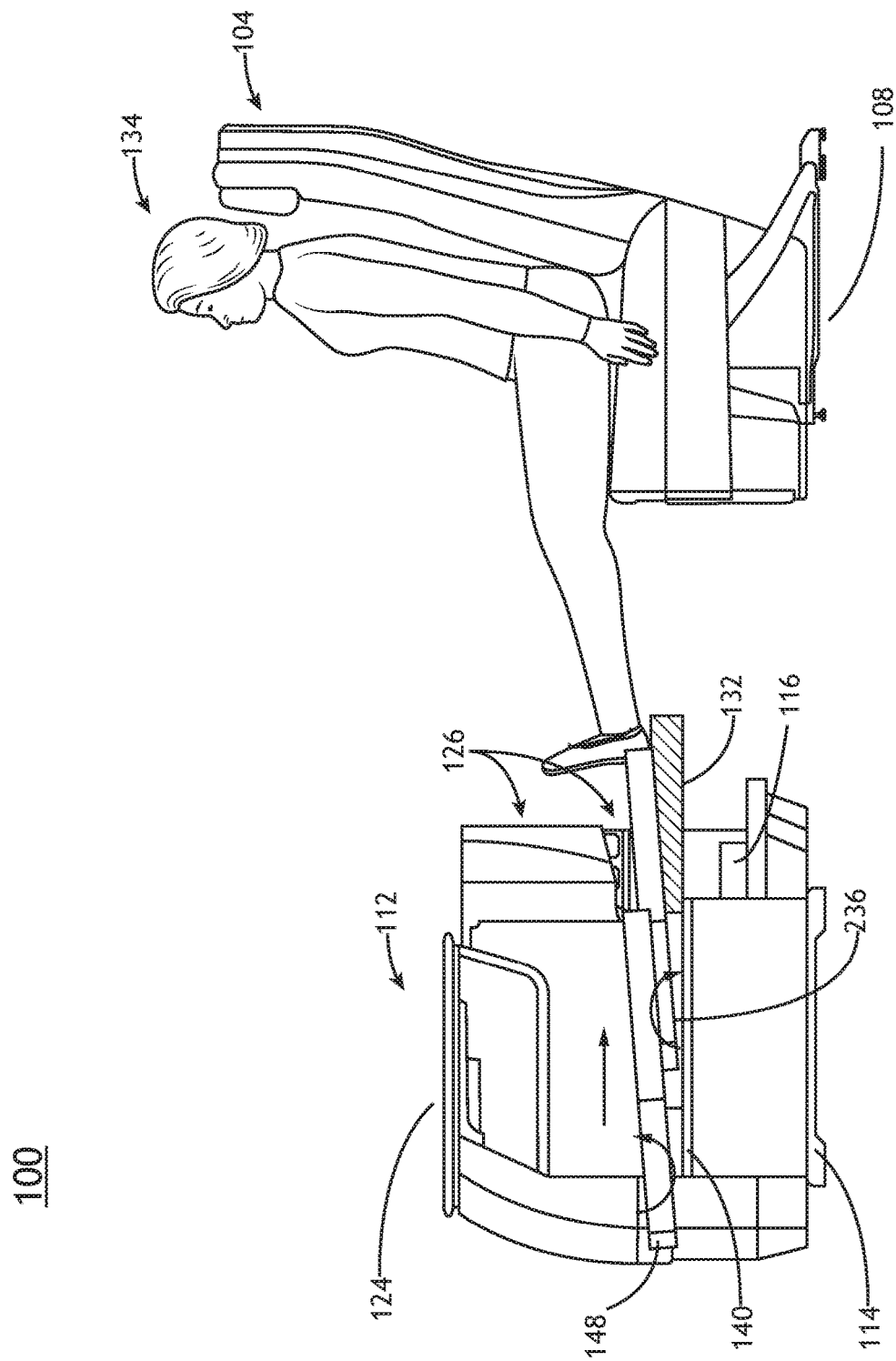
FIG. 3 is a side view of an exemplary embodiment of an ottoman with a resting surface and a passenger seat for an aircraft cabin, where the resting surface is extended towards the seat through a combined rotation and sliding motion.

In some embodiments, a rotation of the resting surface 132 at a pivot point is initiated before the resting surface 132 is actuated (e.g., slid) from a first actuation position to a second actuation position. FIG. 3 is a side view of an embodiment of an ottoman with a resting surface 132 and a passenger seat 104 for an aircraft cabin 100, where the resting surface 132 is extended towards the passenger seat 104 through a combined rotation and sliding motion. When the resting surface 132 is not extended (e.g., in the first actuation position) the actuation assembly 236 restricts lateral movement of the resting surface (e.g., through a locking mechanism). Lifting a free end of the resting surface 132 (e.g., the end facing the passenger seat 104) pivots the resting surface at a pivot point 148, releases (e.g., unlocks) the restrictive action by the locking mechanism of the actuation assembly 236, allowing lateral movement of the resting surface 132). After the resting surface 132 is extended to the second actuation position, the free end of the resting surface 132 is lowered, facilitating the actuation assembly 236 to again restrict lateral movement. Actuation of the resting surface 132 from a second actuation position to a first actuation position (e.g., the home or default position), may similarly require a lifting of the free end of the resting surface 132 before sliding the resting surface to the first actuation position.

It should be noted that the sequence of lifting and sliding the resting surface 132 may be reversed (e.g., so that the sliding motion of the resting surface 132 occurs first). For example, the actuation assembly 236 may be configured so that the resting surface 132 will lock into place once a load is applied to the resting surface 132, a condition that would allow the sliding motion of the resting surface 132 to occur before the lifting and rotation of the resting surface. Therefore, the above description should not be interpreted as a limitation of the present disclosure, but merely an illustration.

The restriction in lateral movement of the resting surface 132 by the actuation assembly 226 is relative to the purpose of the restriction. For instance, restriction of the actuation assembly 226 in extending the resting surface 132 may prevent unintentional extension of the resting surface 132 during takeoff, but allow a passenger 134 to forcibly extend the resting surface 132 without lifting the free end of the resting surface 132. In another instance, the actuation assembly may require the passenger 134 to lift the resting surface 132 before extending the resting surface 132, while allowing the passenger 134 to push the resting surface 132 into the first actuation position without lifting the free end of the resting surface 132.

Figure 4:
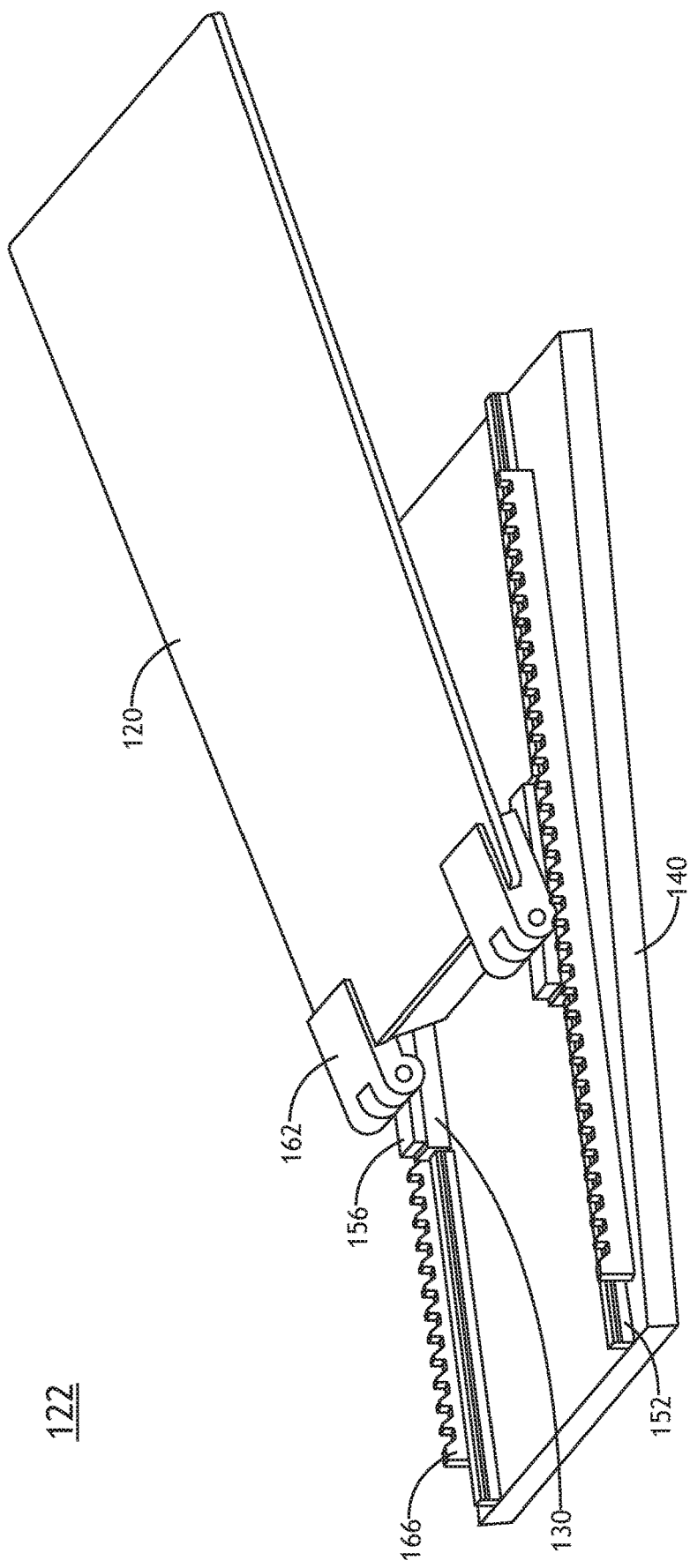
FIG. 4 is a perspective view of an exemplary embodiment of an actuation assembly attached to a resting surface of an ottoman and an attachment surface of an ottoman.

In one embodiment, the actuation of the resting surface 132 is facilitated by an actuation assembly 236 in the form of a track structure. FIG. 4 is a perspective view of an exemplary embodiment of an actuation assembly 236 (e.g., a track, or slide rail structure) attached to a resting surface of an ottoman 112 and an attachment surface 140 of an ottoman 112. In some embodiments, the actuation assembly 236 includes a slide rail 152 attached to the attachment surface 140 (e.g., the surface immediately adjacent and below the resting surface). The slide rail 152 is configured to facilitate a sliding element 156 to slide along the length of the slide rail 152 while resisting detachment (e.g., the slide rail 152 and the sliding element 156 form a matched groove pair or other type of arrangement that allows sliding without the sliding element 156 falling off the slide rail 152).

The sliding element 156 is configured to attach to a slide hinge 162. The slide hinge 162 provides attachment points for both the sliding element 158 and the resting surface 132. The slide hinge 162 also allows the resting surface 132 to pivot in relation to the sliding element 156 (e.g., allowing the resting surface 132 to be lifted upwards as the resting surface 132 is extended outwards).

In one embodiment, the actuation assembly 136 includes a locking assembly. The locking assembly includes a toothed locking guide 166 attached to the attachment surface 140 (e.g., disposed adjacent and parallel to the slide rail 152). The toothed locking guide 166 restricts the movement of the resting surface 132 when the resting surface 132, or a component of the actuation assembly 236 interacts with the toothed segments of the toothed locking guide 166. The incorporation of the toothed locking guide 166 into the actuation assembly 236 facilitated the locking of the resting surface 132 into one of many possible extension lengths. The locking assembly also includes the slide hinge 162.

Figure 5:
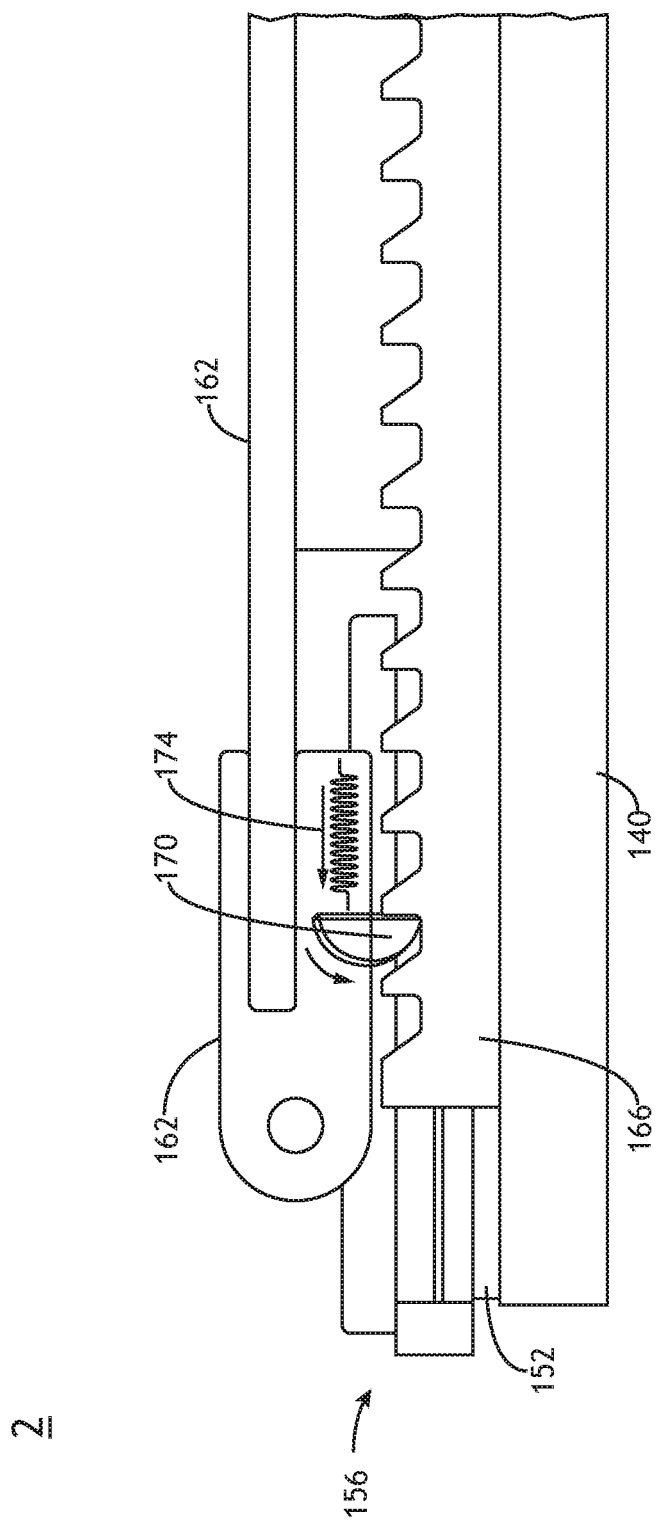
FIG. 5 is a side view of an exemplary embodiment of an actuation assembly in a locked position.

FIG. 5 is a side view of an exemplary embodiment of actuation assembly 236 in a locked position. In some embodiments, the slide hinge 162 includes a spring-loaded paw 170 built into the body of the slide hinge 162. The spring-loaded paw 170 acts to restrict sliding movement of the resting surface 132 relative to the attachment surface 140 (e.g., by inserting into a gap within a toothed locking guide 166). The spring-loaded paw 170 is configured to rotate on a transverse axis within the slide hinge 162 and is shaped so that constant pressure by an internal spring 174 located within the slide hinge 162 forces an portion of the paw forces a portion of the spring-loaded paw 146 outside the body of the slide hinge 162 to engage (e.g., to make contact) with a tooth of the toothed locking guide 166. Once triggered (e.g., a portion of the spring-loaded paw 170 is pushed outward) and interacting with the toothed locking guide 166, the spring-loaded paw 170 will resist movement if the force applied to the exposed portion of the spring-loaded paw 170 forces the internal portion of the spring-loaded paw 170 against the internal spring 174. A triggered and interacting spring-loaded paw 170 will resist movement to a relatively lesser degree if the force applied to the exposed portion of the spring-loaded paw 170 forces the internal portion of the spring-loaded paw 170 away from the internal spring 174.

The teeth of the tooth locking guide 166 may be shaped (e.g., sloped) in order to accentuate the difference in force needed to slide the resting surface 132 in either of the two directions.

It should be noted that the components of the actuation assembly 236 that are attached to the resting surface 132 may instead be attached to the attachment surface 140, and the components of the actuation assembly 136 that are attached to the attachment surface 140 may instead be attached to the resting surface. The switching of the components will still allow the actuation and/or extension of the resting surface 132 from a first actuation position to a second actuation position. Therefore, the above description should not be interpreted as a limitation of the present disclosure, but merely an illustration.

The actuation assembly 236 may be configured to extend the resting surface substantially horizontally from the ottoman 112 (e.g., towards the passenger seat 104). However, the actuation assembly may be configured to extend the resting surface 132 at different angles relative to the horizontal. For instance, the actuation assembly 236 may be configured to extend the resting surface 132 at an ascending angle (e.g., with the resting surface 132 pointing upward, allowing the resting surface 132 to be used to rest the passenger's legs). In another instance, the actuation assembly 236 may be configured to extend the resting surface 132 at a descending angle (e.g., with the resting surface 132 pointing downward, providing a surface for the passenger to position their feet).

It should be noted that the locking assembly may include other types of locking mechanisms. For example, the locking assembly may include a cam action lock. For instance, the cam lock, comprised of a base and a cam, may be coupled to the underside of the resting surface, where the cam is configured to lock onto the slide rail 152 when the cam is rotated. In another example, the locking assembly may include a magnetic lock. For instance, the resting surface 132 may be coupled to a magnet configured to magnetically bind to a metal track on the attachment surface 140. In another example, the locking assembly may include a directional friction lock. For instance, the resting surface 132 and the attachment surface 140 may each be attached to one end of a telescoping friction lock configured to allow the passenger 134 to pull the resting surface 132 towards the passenger seat 104 with low resistance, while allowing the passenger 134 to push the resting surface 132 away from the passenger seat with moderate resistance. This configuration allows the passenger to place their feet on the resting surface without accidentally pushing the resting surface away from the passenger seat 104.

It should be noted that the actuation assemblies described herein may use one or more of the locking mechanisms described herein or any other locking mechanism known in the art. Therefore, the above description should not be interpreted as a limitation of the present disclosure, but merely as an illustration.

Figure 6:
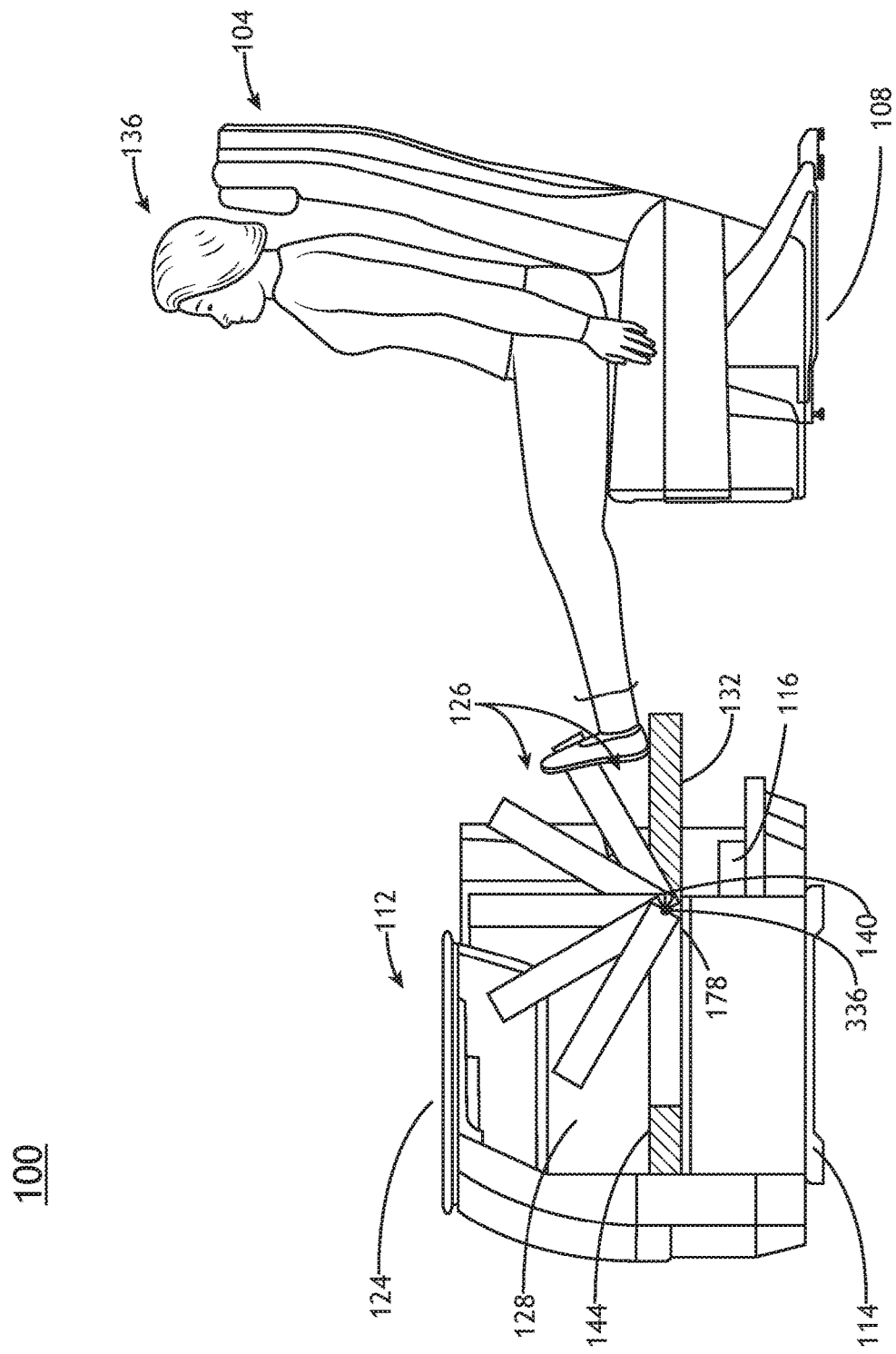
FIG. 6 is a side view of an exemplary embodiment of an ottoman with a resting surface and a passenger seat for an aircraft cabin, where the resting surface rotates about an axis through a hinge between a first rotation position and a second rotation position.

In some embodiments, the resting surface 132 is configured to rotate along an axis from a first rotation position to a second rotation position. FIG. 6 is a side view of an exemplary embodiment of an ottoman 112 with a resting surface 132 and a passenger seat 104 for an aircraft cabin 100, where the resting surface 132 rotates about an axis through a hinge 178 between a first rotation position and a second rotation position. In this exemplary embodiment, an actuation assembly 336 may be configured to include any means to assist in the rotation of the resting surface 132 along an axis. For instance, the actuation assembly 336 may comprise a butt hinge. One end of the butt hinge may be connected to a resting surface 132 (e.g., at or near the end of the resting surface 132 facing the direction of the passenger seat 104). The other end of the flap hinge may be connected to the attachment surface 140 (e.g., an adjacent surface below the resting surface 132). Tension applied to the unhinged side of the resting surface 132 (e.g., manual pulling or tugging upwards on the unhinged side) actuates the rotation of the resting surface 132 along the axis of the hinge between a first position and a second position. In some embodiments, the entirety of the resting surface 132 is rotated from a first position to a second position. In some embodiments, a portion of the resting surface is rotated from a first position to a second position (e.g., with an unactuated portion 144 of the resting surface 132 remaining in place). In some embodiments, the actuation assembly 336 is actuated by one or more actuation devices (e.g., servo motors, solenoids, or the like). In some embodiments, the resting surface 132 may be actuated by either manual exertion or actuation devices.

The actuation assembly 336 may be configured to lock, or resist movement of the resting surface 132 after rotating from a first position to a second position. For instance, the actuation assembly 336 may lock the resting position into a substantially horizontal position. In another instance, the actuation assembly 336 may lock the resting surface 132 into a position ranging from a substantially horizontal position to an ascended position (e.g., with the resting surface 132 pointing upward, allowing the resting surface to be used to rest the passenger's legs). In another instance, the actuation assembly 336 may lock the resting surface 132 into a position ranging from an ascended position to a descended position (e.g., with the resting surface 132 pointing downward, providing a surface for the passenger to position their feet).

It should be noted that any type of hinge may be used within the actuation assembly 336. For instance, a piano hinge (e.g., a continuous hinge) or bi-fold hinge may be used similarly to the butt hinge. In another instance, a knife hinge may be used, wherein the adjacent sides of both the resting surface 132 (e.g., the width surface of the resting surface) and the equivalent side of the attachment surface 140 would be used for attaching the sides of the knife hinge.

The actuation assembly 336 may also comprise a hinge that attaches to an attachment surface 140 on the interior shell 120 or frame 116 of the ottoman. For instance, the attachment surface 140 may attach to a gudgeon (e.g., a socket for attaching to a cylindrical component), and a pintle (e.g., the cylindrical counterpart to the gudgeon) may be configured to attach to the resting surface 132 to allow the rotation of the resting surface 132 along the axis of the cylindrical portion of the gudgeon/pintle hinge. Similar type of actuation assembly componentry may be utilized for the actuation assembly 336.

Figure 7:
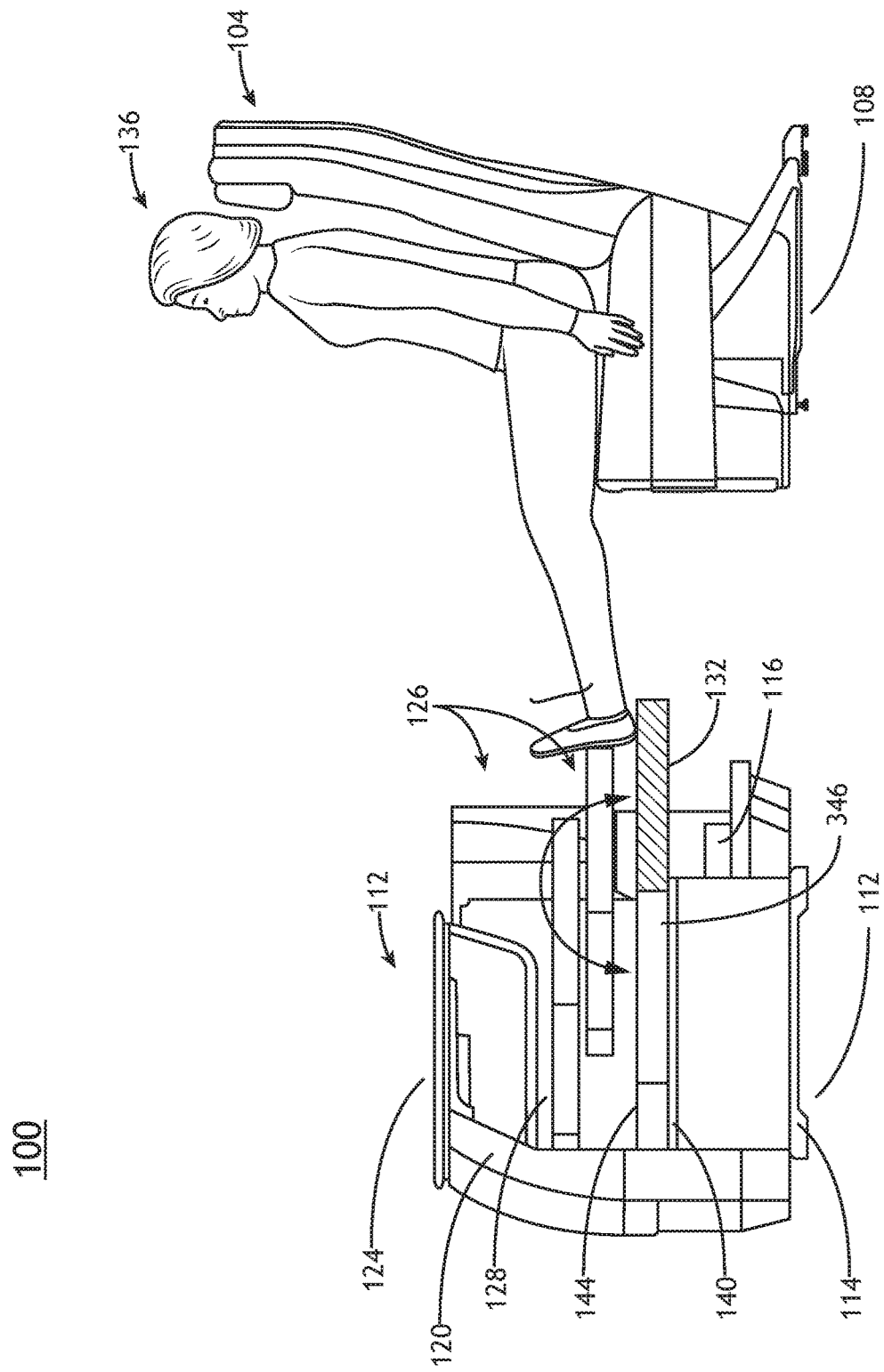
FIG. 7 is a side view of an exemplary embodiment of an ottoman with a resting surface and a passenger seat for an aircraft cabin, where the resting surface is extended towards the passenger seat using a four-bar linkage.

FIG. 7 is a side view of an exemplary embodiment of an ottoman 112 with a resting surface 132 and a passenger seat for an aircraft cabin 100, where the resting surface 132 is extended towards the passenger seat 104 via an actuation assembly 346 comprising a four-bar linkage. A four-bar linkage is a closed-chain linkage consisting of four elements (e.g., bars or links) that are connected in a loop by four joints. The joints are configured so that the elements actuate in parallel planes.

In some embodiments, the resting surface 132 and the attachment surface 140 (e.g., an adjacent panel immediately above or below the resting surface), are linked to each other via a set of two elements (e.g., bars, shafts, or other linkages). The loop formed by the resting surface 132, the attachment surface 140, and the other two elements form the four-bar linkage.

Actuation of the resting surface 132 from a first actuation position to a second actuation via the actuation assembly 346 may require a manual pulling or tugging on the resting surface 132 away from the ottoman 112 to actuate the four-bar linkage. Once pulled free from the first actuation position, the resting surface 132 initially ascends in elevation while extending from the ottoman 112. Once the resting surface 132 has reached its maximum elevation, the resting surface 132 will descend as the resting surface 132 extends further from the ottoman 112. In some embodiments, the actuation assembly 346 is actuated by one or more actuation devices (e.g., servo motors, solenoids, or the like). In some embodiments, the resting surface 132 may be actuated by either manual exertion or actuation devices.

The actuation assembly 346 may be configured to lock, or resist movement of the resting surface 132 after actuating from a first actuation position to a second actuation position. For instance, the actuation assembly 346 may lock the resting position after substantially full extension of the resting surface 132 has been achieved. In another instance, the actuation assembly 346 may lock the resting surface 132 into position before full extension has been achieved (e.g., with the resting surface 132 positioned at a higher elevation than the first actuation position. In another instance, the actuation assembly 346 may lock the resting surface into a position after full extension has been achieved (e.g., with the resting surface 132 positioned at a lower position than the first actuation position).

It should be noted that the actuation assembly 346 may be constructed so that the attachment surface 140 is an adjacent parallel surface above the resting surface 132 (e.g., oriented to the interior ceiling of the ottoman 112, so that the resting surface 132 would initially be pulled in a downward movement. Therefore, the above description should not be interpreted as a limitation of the present disclosure, but merely as an illustration.

In some embodiments, the actuation assembly 346 is configured to actuate the resting surface 132 from a first actuation position to a second actuation position that is substantially parallel to the cabin floor. In some embodiments, the actuation assembly 346 is configured to actuate the resting surface 132 to a second position that is not parallel to the floor (e.g., with the resting surface 132 at an ascending angle, providing a surface for passenger to rest their legs, or with the resting surface 132 at a descending angle, providing a surface for the passenger to position their feet). The change in the angle of the resting surface 132 may be accomplished by altering the angle of the position of the actuation assembly 346, the attachment surface 140, and/or the resting surface 132 at the first actuation position. The change in the angle of the resting surface 132 may also be accomplished by altering the length and position of the elements of the four-bar linkage.

It should be noted that the actuation assemblies 136, 236, 336, 346 may include a locking element configured to lock the resting surface 132 into the desired position (e.g., the second actuation position) upon pressure placed upon the resting position by the passenger 134 (e.g., feet or leg pressure). For instance, foot pressure placed upon the resting surface 132 of a sliding resting surface 132 (e.g., the resting surface 132 of the actuation assembly 136) may engage the locking element of the actuation assembly 136, restricting movement. Upon removal of pressure from the resting surface, the locking element within the actuation assemblies 136, 236, 336, 346 may release (e.g., unlock) allowing movement of the resting surface towards a different position.

In some embodiments, the ottoman 112 further includes a panel to restrict the view of, or to fill in, the voided space that arises from the actuation of the resting surface 132. For example, for an ottoman 112 that utilizes the actuation assembly 336, the panel may cover, or fill the gap of, the large entrance 126 and cavity 128 that is needed to facilitate the rotation of the resting surface 132. The panel may move out of the way of the resting surface 132 as the resting surface 132 moves through the entrance 126 (e.g., either to extend or retract the resting surface 132). Once the resting surface 132 passes through the entrance 126, the panel may return to the default position. The panel may be used with any actuation assembly 136, 236, 336, 346 used for the ottoman 112. In some embodiments, the movement of the panel may be linked to the movement of the resting surface (e.g., the movement of the resting surface 132 and the panel are coordinated). Alternatively, the movement of the panel may not be linked to the movement of the resting surface 132. In some embodiments, the panel may be comprised of a rigid or semi-rigid material (e.g., plastic, wood, or metal).

It should be known that any element that is capable of restricting the view of, or filling in, the voided space within the ottoman 112 may be utilized. For example, a curtain may be used to restrict the view of the voided space. Therefore, the above description should not be interpreted as a limitation of the present disclosure, but merely an illustration.

The ottoman 112 may include a rail assembly coupled to the base 114. The rail assembly may include one or more rails. The rail assembly may include one or more actuatable tracks coupled to the one or more rails. The rail assembly may be coupled to the one or more floor fittings within the floor of the aircraft cabin.

Actuation of the ottoman 112 via the one or more actuatable tracks may be partially assisted by one or more actuation devices. For example, the one or more actuation devices may be coupled to one or more rails and the base of 114 of the ottoman 112. By way of another example, the one or more actuation devices may include, but is not limited to, a gas spring, a mechanical spring, or the like. It is noted herein, however, that the one or more actuation devices may include one or more mechanical devices driven by an actuator such as, but not limited to, one or more gear assemblies (e.g., a worm gear-and-wheel assembly, a rack and pinion assembly, or the like. Actuation of the ottoman 112 via the one or more actuatable tracks may be at least partially driven by one or more actuators (e.g., solenoid, servo motor, or the like. By way of another example, actuation of the ottoman 112 via the rail assembly may be accomplished through manual force. In another example, actuation of the ottoman 112 via the rail assembly may be accomplished through both one or more actuation devices and manual force.

Figure 8:
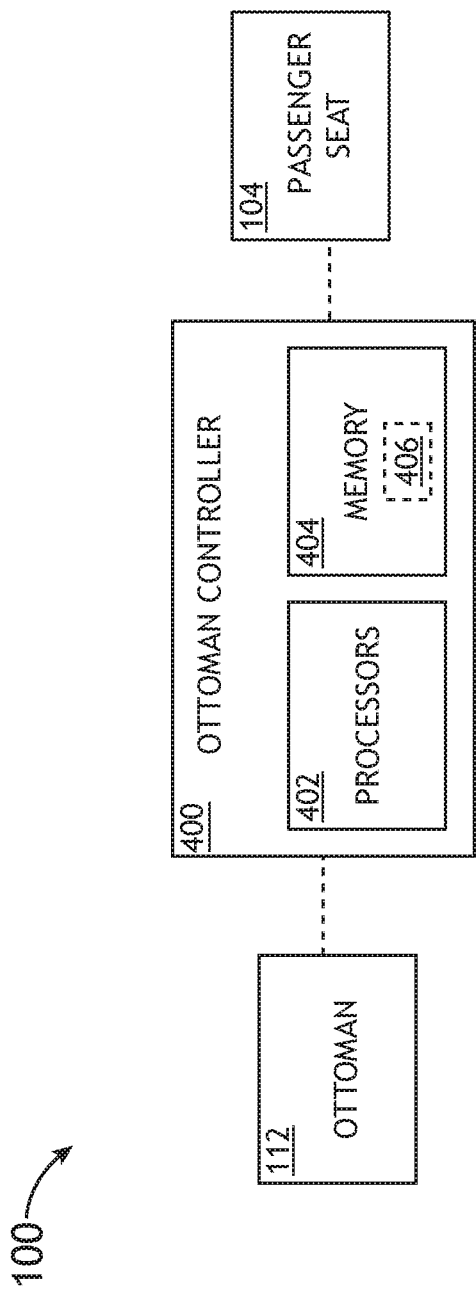
FIG. 8 is a block diagram of an exemplary embodiment of an ottoman and a passenger seat, in accordance with the inventive concepts disclosed herein.

The ottoman may include one or more ottoman controllers 400 (e.g., as illustrated in FIG. 8). The ottoman controller 400 may include one or more processors 402 and memory 404. The memory may store one or more sets of program instructions 406. The one or more processors 402 may be configured to execute the one or more sets of program instructions 406 to carry out one or more of the various steps described throughout the present disclosure. The one or more ottoman controllers may be installed on or within the ottoman 112, the passenger seat, and/or a component of the aircraft cabin.

The one or more ottoman controllers 400 may be communicatively coupled to the rail assembly and/or the actuation assembly 136, 236, 336, 346. The ottoman controller 400 may be located on, within, or near ottoman 112, the passenger seat 104, or another component of the aircraft cabin 100 (e.g., at a console operated by a crewmember). For instance, a passenger 134 operating the ottoman controller 400 (e.g., while sitting in a passenger seat 104, the ottoman controller 400 located within the armrest of the passenger seat 104) may command the ottoman controller 400 (e.g., using a switch, button, touch screen, or other input device) to actuate the actuation assembly 136 configured to slide the resting surface 132 towards the passenger seat 104. In another instance, the passenger 134 operating the ottoman controller 400 may command the rail assembly to move the entire ottoman 112 towards the passenger seat.

The one or more ottoman controllers 400 may be configured to sense the position of the rail assembly and or the actuation assembly 136, 236, 336, 346. For instance, a passenger 134 operating the ottoman controller 400 may accidentally command the ottoman 112 to actuate the actuation assembly 136 configured to slide the resting surface 132 towards the passenger seat 104 even though the ottoman 112 is already positioned immediately adjacent to the passenger seat 104. The ottoman controller 400, detecting that the position of the ottoman 112 is too close to the passenger seat 104 to safely actuate the actuation assembly 136, would then prevent the actuation assembly 136 from activating. In another instance, the ottoman controller 400, sensing that the ottoman 112 has the resting surface 132 fully extended towards the passenger seat 104 would prevent the ottoman 112 from actuating further towards the passenger seat 104 by restricting movement of the rail assembly.

The one or more processors 402, may include any one or more processing elements known in the art. In this sense, the one or more processors 402, may include any microprocessor device configured to execute algorithms and/or program instructions. In general, the term "processor" may be broadly defined to encompass any device having one or more processing elements, which execute a set of program instructions from a non-transitory memory medium (e.g., the memory 404), where the one or more sets of program instructions 406 is configured to cause the one or more processors 402 to carry out any of one or more process steps.

The memory 404 may include any storage medium known in the art suitable for storing the one or more sets of program instructions 406 executable by the associated one or more processors 402. For example, the memory 404 may include a non-transitory memory medium. For instance, the memory 404 may include, but is not limited to, a read-only memory (ROM), a random-access memory (RAM), a magnetic or optical memory device (e.g., disk), a magnetic tape, a solid-state drive, and the like. The memory 404 may be configured to provide display information to a display device. In addition, the memory 404 may be configured to store user input information from a user input device. The memory 404 may be housed in a common controller housing with the one or more processors 402. The memory 404 may, alternatively or in addition, be located remotely with respect to the spatial location of the processors 402, and the one or more ottoman controllers 400. For instance, the one or more processors 402 and/or the one or more ottoman controllers 400 may access a remote memory 404 (e.g., server), accessible through a network (e.g., internet, intranet, and the like) via one or more communication interfaces.

The one or more ottoman controllers 400 may be configured to receive and/or acquire data or information from other systems or tools via the one or more communication interfaces that may include wireline and/or wireless portions. In addition, the one or more passenger compartment controllers 400 may be configured to transmit data or information (e.g., the output of one or more procedures of the inventive concepts disclosed herein) to one or more systems or tools via the one or more communication interfaces that may include wireline and/or wireless portions. In this regard, the transmission medium may serve as a data link between the one or more ottoman controllers 400 and/or other subsystems. In addition, the one or more ottoman controllers 400 may be configured to send data to external systems via a transmission medium (e.g., network connection).

The actuation of the ottoman 112 via the rail assembly may allow a coordination of various configurations between the ottoman 112, the passenger seat 104, and/or other cabin components. For instance, the ottoman 112 may coordinate with the passenger seat 104 in one or more configurations for bed mode. In this bed mode configuration, the ottoman 112 may be moved manually, or automatically through accessing the ottoman controller 400, towards the passenger seat 104 (e.g., immediately adjacent to the seat pan), forming a continuous surface that can be used for sleeping. For passenger seats 104 that have an extendable leg rest, the ottoman 112 may have more than one bed mode. For instance, the ottoman 112 may be configured to move to a position immediately adjacent to the extendable leg rest that has been actuated to an extended position. The ottoman 112 may also be configured to move to a position immediately adjacent to the seat pan with the extendable leg rest not extended (e.g., for smaller children).

The ottoman 112 may be configured to have one or more sections of the ottoman 112 actuated via the rail assembly, and another section of the ottoman 112 that is not actuatable (e.g., a segmented, bifold, or inset configuration). For instance, an ottoman 112 comprised of two sections may be configured to align as a single piece in a default position (e.g., the two sections abutting next to each other.) One section of the ottoman 112 may then be moved manually, or automatically through accessing the ottoman controller 400, approximately halfway towards the passenger seat (e.g., creating a seating space on the immobile section of the ottoman 112, and a seating space or table space on the mobile section of the ottoman 112. In another instance, the ottoman 112 may be configured to include a second smaller ottoman-like structure that is telescoped, or inset, to the larger ottoman 112. Upon movement by the ottoman 112 from the default position (e.g., the TTOL position) towards the passenger seat 104, the smaller ottoman-structure may remain immobile. In another instance, the smaller ottoman-like structure may be mobile and move towards the passenger seat 104, while the larger ottoman may remain immobile. In another instance, all sections of the ottoman 112 are mobile.

The ottoman 112 may be configured for use as a buddy dining seat. For instance, the ottoman 112 may be configured to facilitate the ability of a passenger to sit on the ottoman and dine adjacent to (e.g., facing) a person in the passenger seat 104. The ottoman 112 may have handles, straps and/or recesses that allow a passenger 134 to grab onto the ottoman in order to adjust their seating position. The ottoman 112 may configured to actuate via the rail assembly to allow the person sitting on the ottoman 112 to sit closer, or further away, from the passenger seat 104 (e.g., to make room for an eating table or tray).

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

It is also understood that embodiments of the disclosure wherein may include one or more steps for actuation of elements from a first actuation position to a second actuation position. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein. Further, the order, combination, and/or addition of sub-steps as described above may be carried out for the actuation of elements from a second actuation position to a first actuation position.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An ottoman for an aircraft passenger seat, comprising:
   a base;
   a frame;
   a shell;
   a resting surface;
   an actuation assembly configured to actuate the resting surface from a first actuation position to a second actuation position relative to the base; and
   an attachment surface configured to provide an anchor point for the actuation assembly
   a slide rail attached to at least one of the attachment surface or the resting surface;
   a slide element assembly attached to at least one of the attachment surface or the resting surface, configured to allow the sliding of the resting surface from the first actuation position to the second actuation position relative to the base;
   a locking assembly configured to restrict sliding movement of the resting surface, wherein the locking assembly facilitates sliding of the resting surface from the first actuation position to the second actuation position relative to the base upon vertical actuation of a free end of the resting surface;
   a toothed locking guide disposed adjacent and parallel to the slide rail;
   a slide hinge configured to attach the sliding element to the resting surface or the attachment surface, and configured to rotate along a transverse axis; and
   a spring-loaded paw attached to the slide hinge configured to contact the toothed locking guide.

2. The ottoman of claim 1, the actuation assembly further comprising:
   a hinge attached to the attachment surface and the resting surface configured to facilitate a rotation of the resting surface about an axis through the hinge between a first rotation position and a second rotation position.

3. The ottoman of claim 1, further comprising a panel configured to at least one of block a view of a cavity of the ottoman or fill in a portion of the cavity of the ottoman, wherein the cavity of the ottoman is configured to facilitate the actuation of the resting surface.

4. The ottoman of claim 1, the actuation assembly further comprising a 4-bar linkage configured to actuate the resting surface, comprising:
   a first element connecting the resting surface the attachment surface;
   a second element parallel to the first element connecting the resting surface the attachment surface.

5. The ottoman of claim 1, further comprising a controller communicatively coupled to the actuation assembly configured to at least one of detect or control a position of the resting surface.

6. The ottoman of claim 1, further comprising a rail assembly, comprising:
   one or more rails;
   one or more actuatable tracks coupled the one or more rails, wherein the ottoman is configured to allow a selective movement of the ottoman along the one or more actuatable tracks in a first direction.

7. The ottoman of claim 6, wherein the selective movement positions the ottoman into at least one position for bed mode adjacent to a passenger seat.

8. The ottoman of claim 6, further comprising a section of the ottoman that is not configured to allow a selective movement in the first direction.

9. The ottoman of claim 6, wherein the ottoman is configured for use as a dining seat.

10. The ottoman in claim 6, further comprising a controller communicatively coupled to the actuation assembly configured to detect the position of at least one of the resting surface or the base.

11. The ottoman in claim 6, further comprising a controller communicatively coupled to the actuation assembly configured control at least one of the actuation of the resting surface or the actuation of the tracks.

12. The ottoman of claim 1, wherein the resting surface is configured to extend toward the passenger seat.

13. The ottoman of claim 1, wherein and extension of the resting surface toward the passenger seat is substantially horizontal.

14. The ottoman of claim 1, wherein the extension of the resting surface toward the passenger seat is at least one of ascending or descending angle relative to the horizontal.

15. The ottoman of claim 6, wherein the ottoman may be configured as having two or more sections.

* * * * *